United States Patent [19]

Fehr

[11] Patent Number: 4,462,217
[45] Date of Patent: Jul. 31, 1984

[54] PROCESS AND APPARATUS FOR THE CONTROL OF A VOLUME OF FLUID MOVING THROUGH A DUCT SYSTEM

[75] Inventor: Werner Fehr, Steinheim, Fed. Rep. of Germany

[73] Assignee: Sueddeutsche Kuehlerfabrik Julius Fr. Behr GmbH & Co. KG, Stuttgart, Fed. Rep. of Germany

[21] Appl. No.: 331,579

[22] Filed: Dec. 17, 1981

[30] Foreign Application Priority Data

Dec. 17, 1980 [DE] Fed. Rep. of Germany ....... 3047426

[51] Int. Cl.³ .......................... B60H 3/00; F04B 49/06
[52] U.S. Cl. ......................................... 62/133; 417/45
[58] Field of Search ........................... 417/45, 53, 280; 62/133; 98/15, 116

[56] References Cited

U.S. PATENT DOCUMENTS

| | | | |
|---|---|---|---|
| 1,783,036 | 11/1930 | Crawford | 417/280 |
| 3,441,200 | 4/1969 | Huesgen | 417/53 |
| 3,945,308 | 3/1976 | Jakimowicz | 417/280 |
| 4,044,287 | 8/1977 | Ratzel | 62/133 |
| 4,108,575 | 8/1978 | Schal | 417/53 |
| 4,205,944 | 6/1980 | Rohrberg et al. | |
| 4,225,289 | 9/1980 | Burkett | 417/18 |

FOREIGN PATENT DOCUMENTS

| | | |
|---|---|---|
| 2341296 | 8/1973 | Fed. Rep. of Germany . |
| 48104 | 4/1981 | Japan ...................................... 62/133 |

*Primary Examiner*—William L. Freeh
*Attorney, Agent, or Firm*—Schwartz, Jeffery, Schwaab, Mack, Blumenthal & Koch

[57] ABSTRACT

Disclosed is a method for controlling the volume of a fluid, e.g., air, moving through a duct system, e.g., a ventilating system for a vehicle, comprising the steps of moving the fluid through an inlet of the duct system under dynamic pressure; conducting the fluid through the duct system by means of propulsion system driven by an electric motor, wherein the electric current drawn by said motor varies with changes in the dynamic pressure; and adjusting the amount of fluid admitted into the duct system in response to the current drawn by the motor and thus, also responsive to the dynamic pressure, this adjusting step thereby maintaining a constant volume of fluid moving through the air duct system. Also disclosed is an apparatus for carrying out this method.

10 Claims, 2 Drawing Figures

PROCESS AND APPARATUS FOR THE CONTROL OF A VOLUME OF FLUID MOVING THROUGH A DUCT SYSTEM

BACKGROUND OF THE INVENTION

The present invention relates to a process and apparatus for the control of a volume of a fluid in a duct system, and more especially to a process and apparatus for controlling the volume of air moving through an air duct system.

Such a process is disclosed in German Offenlegungsschrift No. 2341296. In this known process, as shown by the circuit layout associated therewith, the direct current motor driving the blower is supplied with a constant current, so that the volume of air moved by the blower will increase at a lower rate corresponding to rising dynamic pressures. The volume of air is thus controlled only by means of the motor voltage, i.e., the rpm of the blower, while the blower is constantly exposed to the full dynamic pressure. The disadvantage of this known process is that with rising dynamic pressures the motor voltage may attain the value of zero at a relatively low vehicle velocity, and then the volume of air moving through the blower will be directly proportional to the velocity of the vehicle and of the oncoming flow of air. This condition substantially limits the range of application of this electronic blower control, which in part is no longer suitable for present day vehicles. For the continued functional use of this blower control mechanism, negative motor terminal voltages, in combination with a reversal of the current, would be required even at relatively low vehicle velocities, which would be detrimental for the motor and the circuit of the blower.

SUMMARY OF THE INVENTION

It is an object of the present invention to eliminate the disadvantages of the known process and to provide a process for controlling a volume of fluid, preferably air, moving through a duct system.

It is a further object of the invention to provide a process which simply and effectively controls a volume of air moving through an air duct system at a predetermined value, under varying dynamic pressure.

Another object of the invention resides in providing an improved process and apparatus for controlling the flow of air into the passenger compartment of a vehicle.

It is a further object of the invention to provide a process of the type described above which operates in a vehicle without the use of a sensor or transducer for determining the velocity of the vehicle, and wherein the process is effectively applicable within a wide range of vehicle velocities.

In accomplishing the foregoing objects, there has been provided in accordance with the present invention a process for controlling the volume of a fluid, preferably air, moving through a duct system, comprising the steps of moving the fluid through an inlet of the duct system under dynamic pressure; conducting the fluid through the duct system by means of a propulsion system driven by an electric motor wherein the electric current drawn by the motor varies with changes in the dynamic pressure; and adjusting the amount of fluid admitted into the duct system in response to the current drawn by the motor and thus, also responsive to the dynamic pressure, said adjusting step thereby maintaining a constant volume of fluid moving through the duct system. Preferably, said adjusting step further comprises generating a signal responsive to variations in the current drawn by the motor; relaying the signal to an adjusting drive; and then moving a throttling device located in the duct system by means of the actuating drive in response to the signal. In further accordance with the present invention, the motor voltage of the blower can be varied, either manually or by a programmed device, by means of a set point adjuster, thereby varying the volume of air moving through the air duct system without affecting the position of the throttling device.

In further accomplishing the foregoing objects, there has been provided a control circuit for controlling a throttling device in a fluid duct system in response to changes in dynamic pressure upon a fluid propulsion system driven by an electric motor comprising a first output, preferably in the form of an operational amplifier, responsive to an increase of current drawn by the motor in response to an increase in dynamic pressure; a second output, preferably in the form of a second operational amplifier, responsive to a decrease of current drawn by the motor in response to a decrease in dynamic pressures; and means, connected to and responsive to both said first and second outputs, for actuating the throttling device in response to a signal from either output. Preferably, the actuating means comprises a servomotor; means comprising a first and second magnetic valve for actuating the servomotor; and means for connecting said first and second output to said first and said magnetic valves, respectively.

Further objects, features and advantages of the present invention will become apparent from the detailed description of the preferred embodiments which follows, when considered together with the attached figures of drawing.

DETAILED DESCRIPTION OF THE PREFERRED EMBODIMENTS

Figure 1:
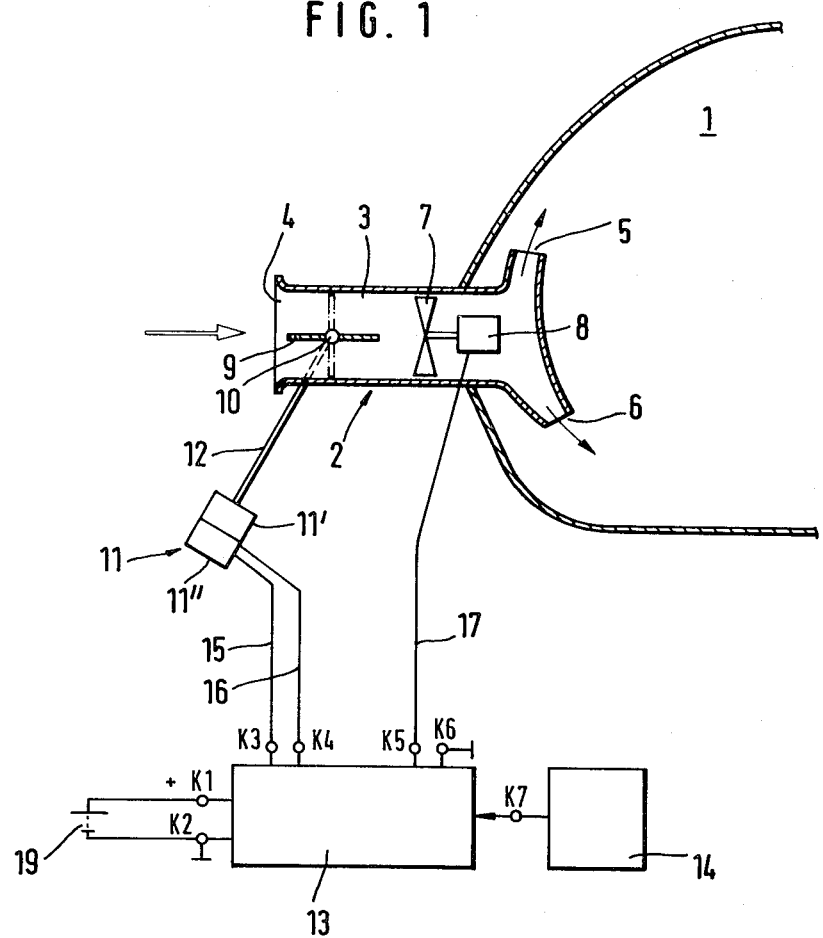
FIG. 1 is a cross-sectional side view of the components of the control circuit for the process according to the invention.

The invention relies on the known fact that the current drawn by a direct current motor driving a blower with blades curving in the forward direction varies proportionally to a rise or fall in dynamic pressure. According to the present invention, the varying motor current is utilized as a signal for the control of a throttle device arranged in the air duct system. Thus, for example, in the case of a blower with forwardly curving blades driven by a direct current motor, an increase in the motor current, which results from a rise in the dynamic pressure, adjusts the setting of the throttle device, so that the dynamic pressure in front of the blower and hence the motor current, will be reduced. The reduction in pressure allows for the attainment of a constant volume of air moving through the air duct system for an entire range of velocities, provided that the desired value of the volume of air is unchanged. The process thus operates without a sensor which is provided to detect either the dynamic pressure or the velocity of the vehicle and then relay a signal to the control device. As a result, a failure-prone, additional structural element is thereby eliminated, while still providing an effective and reliable control function. By throttling the flow of air in the air duct with a throttling device, it is possible to regulate the volume of air over the entire vehicle velocity range, because at high vehicle velocities the dynamic pressure is reduced so that the volume of air moving through the air duct system remains at its predetermined value.

According to one embodiment of the invention, a signal is generated responding to variations in motor current. The signal is then relayed by means of a control device to the actuating drive of the throttle device. This results in a relatively simple layout for the entire control circuitry.

According to a further advantageous aspect of the invention, the motor voltage may be varied manually or as a function of a program to regulate the volume of air, without changing the setting of the throttle. This makes it possible to continuously adjust the volume of air entering the passenger compartment to individual or external conditions without interfering with the control process.

A further advantageous aspect of the process and apparatus according to the invention is a bridge circuit, provided for the control device, which detects increasing and decreasing motor currents. The bridge circuit is connected to a first and second output comprised of a first and second operational amplifier. The outputs, in response to increasing or decreasing motor current, produce a signal which causes an actuating device, connected thereto, to move the throttling device.

According to a further embodiment of the invention, the actuating drive consists of a vacuum cell (servomotor) and two magnetic valves actuating the vacuum cell (control), wherein the magnetic valves are actuated via transistors by the outputs of the operational amplifiers. The current variation signal of the motor is converted by the electronic circuit layout, i.e., the control device, into a suitable output signal, which in turn controls by means of an appropriate adjusting drive the throttling device and thus the volume of air in the air duct system.

According to a further development of the invention, a set-point adjuster is provided in the motor circuit in the form of a potentiometer for adjusting the volume of air desired at any given time. The set-point adjuster sets the motor voltage and thus the rpm of the motor, and thereby the volume of air moved. The desired volume of air is set manually or automatically, by setting the potentiometer so that the control of the air volume may always be adjusted to different desired values. It should be noted here that the desired value set is not necessarily constant, but may represent an arbitrary function to be called up from a memory.

With regard to the practice of the process according to the invention, it should be noted that the control of the volume of air is not restricted to direct current motors or to a blower wheel with forwardly curving blades. The essential feature is that the motor current of the blower varies with the dynamic pressure. This dependence of the motor current on the dynamic pressure may be represented by any arbitrary function delivering a discrete signal to the control device for a certain value of the vehicle velocity or the dynamic pressure. This function may be stored in the vehicle and the appropriate signal may then be derived by comparison with the actual instantaneous value, to actuate the adjusting device for the throttling device.

The process according to the invention may be applied advantageously to the control of mass flow of media other than air. Thus, for example, the flow of water may be maintained constant as a function of the current uptake of the motor driving the water pump.

Finally, current variations of alternating current motors may also serve as the input signals for a control device, if an alternating current circuit is provided which is adapted to the purpose of this application.

The process according to the invention and the circuit layout for the embodiment of the process shall be explained in more detail hereinafter with the aid of the drawings.

FIG. 1 illustrates the passenger compartment 1 of an automotive vehicle, which is supplied with suitably treated air by means of a ventilating, heating or air-conditioning system. The air enters through an inlet (not shown) on the vehicle, due to dynamic pressure, into the air intake 4 of the air duct 3 and is moved by means of the blower wheel 7, driven by the direct current motor 8, through the air outlet nozzles 5, 6, into the passenger compartment 1. The blower wheel 7 has the configuration of a radial blower with forwardly curving blades, as is customary at the present time in low-noise heating and air-conditioning installations. A centrally hinged throttle valve 9 is further arranged in the air duct 3. The throttle valve 9 pivots around the axle 10 in the air duct 3, so that the air inlet cross-section is infinitely variable. The throttle valve 9 is actuated through a suitable bar linkage 12 by means of an adjusting drive 11. The servomotor 11' may have the form of a conventional vacuum cell, and actuating means 11'' which may consist of two magnetic valves, not shown in detail in FIG. 1. The servomotor 11' is actuated by the two electric signal lines 15 and 16, connected by means of the terminals K3 and K4 with the electronic control device 13. The control device 13 is connected through the terminals K1 and K2 with a voltage source 19, usually provided by the battery of the vehicle. The control device 13 is further connected through the terminal K5 and the line 17 with the blower motor 8 and through the terminal K7 with the set-point adjuster 14, while the terminal K6 is connected to the frame of the vehicle.

Figure 2:
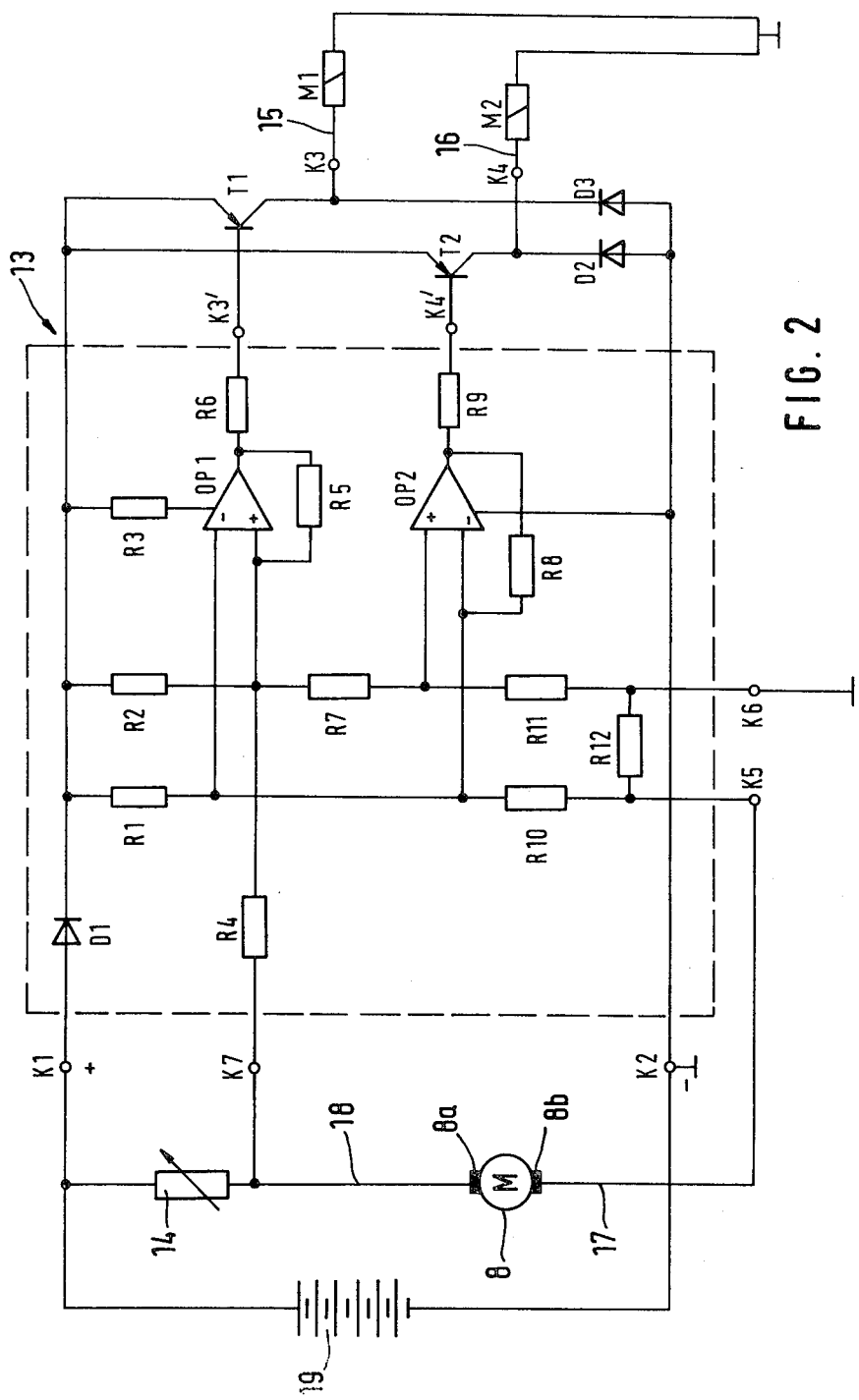
FIG. 2 is a schematic diagram of the electronic control device for carrying out the process according to the invention.

FIG. 2 shows the circuit layout of the electronic control device 13, together with its connections with the associated components of the entire control system. The motor circuit 17, 18 is connected with the control device 13 by means of the terminals K1, K5, and K7. The motor 8 is supplied with current from the battery 19 of the vehicle, while the rpm desired is set by means of the set-point adjuster 14. The set-point adjuster may be in the form of a potentiometer, so that different currents may flow through the motor 8, depending on the setting of the potentiometer 14. The voltage output signal of the potentiometer 14 at the positive terminal 8a of the motor is conducted through the terminal K7 and the pre-resistance R4 to the positive input of the first operational amplifier OP1. The negative terminal 8b of the motor 8 is connected to the control device 13 through the line 17 and the terminal K5. The control device is supplied with current from the battery 19 which enters through the positive terminal K1 and exits through the negative terminal K2, which is connected to the frame of the vehicle. The input to the control device 13 is characterized by a bridge circuit, consisting of the resistances R1, R2 and R10, R11, with a precision resistor R12 being placed between R10 and R11, connected to one side to the terminal K5 and on the other with the grounded terminal K6. The potential between the resistance R1 and R10 is connected to the negative inputs of the first and the second operational amplifiers OP1 and OP2, while the potentials between the bridge resistances R2 and R11 are connected with the positive inputs of the first and second operational amplifier OP1 and OP2. The outputs of the two operational amplifiers OP1 and OP2 may be connected with the terminals K3' and K4', which may constitute the output of the basic circuit control device 13. However, in the embodiment represented, the outputs of the two operational amplifiers OP1 and OP2 are connected directly to the respective base of a first and a second transistor T1 and T2. The collectors of the transistors T1 and T2 are connected through the terminals K3 and K4 and the corresponding signal lines 15 and 16 to the magnetic valves M1 and M2, with the outputs thereof being grounded. In addition to these essential components, the control device 13 also contains the diodes D1, D2 and D3 and the additional resistances R3, R5, R6, R7, R8 and R9 to complete the circuit. The magnetic valves M1 and M2 form the actuating means 11", thereby controlling the adjusting drive 11, and thus the movement and the position of the throttle valve 9 in the air duct 3.

In the example described hereinabove, the electronic control device 13 and the process according to the invention for the control of the volume of air operate in the following manner:

When the dynamic pressure in the air duct 3 is increasing as the result of the increasing velocity of the vehicle, the current taken up by the motor 8 is also rising, because an additional momentum, i.e., a higher stress, is generated on the blower wheel 7, due to the characteristic of the forwardly curved blades. The incremental current in the motor circuit 17, 18 leads to an increased voltage drop at the precision resistor R12, resulting in the detuning of the bridge R1, R2, and R10, R11. The signal generated in this manner is amplified by the operational amplifier OP2 and conducted to the base of the transistor T2, which thereupon allows the collector current to flow through the magnetic valve M2, via the terminal K4. The magnetic valve M2 effects the setting of the servomotor 11' and its bar linkage 12 in a manner so that the throttle valve 9 progressively narrows the inlet cross-section of the air duct 3. This narrowing of the cross-section reduces the dynamic pressure prevailing in front of the blower wheel 7 and thereby also reduces the current drawn by the motor 8 since the stress on the blower 7 has been reduced. When the motor current has regained its former value, i.e., when the change in the current has become zero, the voltage applied to the base of the transistor is no longer sufficient to allow the collector current to flow, so that the magnetic valve M2 is also returned to its original position and the motion of the throttle valve 9 is terminated. If the dynamic pressure in the air duct continues to increase, the above-described control process is repeated so that the throttle valve 9 will progressively narrow the air inlet cross-section.

If, however, the dynamic pressure decreases as the result of the reduced velocity of the vehicle, the current in the motor circuit 17, 18 will decrease also. This leads to an output of an altered signal from the first operational amplifier OP1; this output signal will render the transistor T1 conducting, allowing the collector current to flow through the terminal K3 and the signal line 15, thereby actuating the magnetic valve M1 so that the throttle valve 9 is moved back by the servomotor 11', and thus widens the inlet 4 of the air duct 3. The cross-section of the air duct 3 is thereby increased and hence also the effect of the dynamic pressure on the blower 7, and thus the motor current attains a higher value. A constant motor current is thus assured by maintaining a constant air flow. This throttling process thereby protects the blower from overloading caused by excessve dynamic pressures. By these means, effective and safe regulation of the volume of air passing through the blower is attained in the range of high vehicle velocities.

What is claimed is:

1. A process for controlling the volume of air moving through a duct system and admitted into the passenger compartment of a vehicle, comprising the steps of:
    (a) moving the air through an inlet of the duct system under dynamic pressure;
    (b) conducting the air through the duct system by means of a propulsion system comprising a radial blower with forwardly curved blades driven by a direct current electric motor, wherein the electric current drawn by said motor varies with changes in the dynamic pressure of the air in the duct system; and
    (c) adjusting the amount of air admitted into the duct system by varying the cross-sectional area of said duct system in response to the current drawn by said motor and thus, also responsive to the dynamic pressure of said air, said adjusting step thereby maintaining a constant volume of air moving through the air duct system.

2. A process according to claim 1, wherein said adjusting step further comprises:
    (a) generating a signal responsive to variations in the current drawn by said motor;
    (b) relaying said signal to an adjusting drive; and
    (c) moving a throttling device located in the duct system by means of said actuating drive in response to said signal.

3. A process according to claim 1 or 2, further comprising the step of varying the motor voltage of said blower externally, by means of a set point adjuster, thereby varying the volume of air moving through the air duct system without affecting the position of said throttling device.

4. A process according to claim 3, wherein said varying step is carried out manually.

5. A process according to claim 3, wherein said varying step is carried out by a programmed device.

6. In an automobile having a passenger compartment and a fluid duct system for admitting air into said passenger compartment, a control circuit for controlling a throttling device in said fluid duct system in response to changes in dynamic pressure upon a fluid propulsion system in said fluid duct system driven by an electric motor, comprising:
    (a) a first output circuit responsive to an increase of current drawn by the motor in response to an increase in dynamic pressure of air in said fluid duct system;
    (b) a second output circuit responsive to a decrease of current drawn by the motor in response to a decrease in dynamic pressure of air in said fluid duct system; and
    (c) means, connected to and responsive to both said first and second output circuits, for actuating said throttling device in response to a signal from either output circuit for varying the free cross-sectional area of said fluid duct system to control the amount of air passing through said fluid duct system.

7. A control circuit according to claim 6, wherein said actuating means comprises:
(a) a servomotor;
(b) a means comprising a first and second magnetic valve for actuating said servomotor; and
(c) means for connecting said first and second output circuit to said first and second magnetic valves, respectively.

8. A control circuit according to claim 6 or 7, further comprising a set point adjuster arranged in the control circuit so as to allow adjustment of the voltage applied to the motor.

9. A control circuit according to claim 8 wherein said first output circuit comprises a first operational amplifier; and said second output circuit comprises a second operational amplifier, and said control circuit further comprises:
a bridge circuit including a first, second, third and fourth resistor and a precision resistor, through which the motor current flows, and wherein said first and second resistors are connected with the inputs of a first operational amplifier, and said third and fourth resistors are connected to the inputs of a second operational amplifier.

10. A circuit layout according to claim 9, wherein said connecting means comprises:
(a) a first transistor electrically connecting the output of said first operational amplifier to said first magnetic valve; and
(b) a second transistor electrically connecting the output of said second operational amplifier to said second magnetic valve.

* * * * *